US008599766B2

(12) United States Patent
Kishiyama et al.

(10) Patent No.: US 8,599,766 B2
(45) Date of Patent: Dec. 3, 2013

(54) TRANSMISSION DEVICE, RECEPTION DEVICE AND RANDOM ACCESS CONTROL METHOD

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 650 days.

(21) Appl. No.: 12/161,175

(22) PCT Filed: Jan. 10, 2007

(86) PCT No.: PCT/JP2007/050179
§ 371 (c)(1),
(2), (4) Date: Oct. 21, 2008

(87) PCT Pub. No.: WO2007/083550
PCT Pub. Date: Jul. 26, 2007

(65) Prior Publication Data
US 2010/0240379 A1   Sep. 23, 2010

(30) Foreign Application Priority Data
Jan. 17, 2006   (JP) .................................. 2006-009297

(51) Int. Cl.
*H04W 4/00* (2009.01)
(52) U.S. Cl.
USPC ......................................... 370/329; 455/435.1
(58) Field of Classification Search
USPC ................................................ 370/328–329
See application file for complete search history.

(56) References Cited

U.S. PATENT DOCUMENTS

| 5,781,536 | A  | * | 7/1998 | Ahmadi et al. ............... 370/252 |
| 6,259,724 | B1 |   | 7/2001 | Esmailzadeh |
| 6,574,212 | B1 | * | 6/2003 | Jurgensen et al. ............ 370/348 |
| 6,647,262 | B1 |   | 11/2003 | Demetrescu et al. |
| 7,127,260 | B1 | * | 10/2006 | Kim et al. .................. 455/456.4 |
| 2003/0100269 | A1 | * | 5/2003 | Lehtinen et al. ............... 455/69 |
| 2007/0195730 | A1 |   | 8/2007 | Cheng et al. |

FOREIGN PATENT DOCUMENTS

| CN | 1234169 A | 11/1999 |
| CN | 1286580 A | 3/2001 |
| JP | 2001-16215 A | 1/2001 |
| JP | 2004-282653 A | 10/2004 |
| WO | 2004/038951 A2 | 5/2004 |
| WO | 2005/086520 A1 | 9/2005 |

OTHER PUBLICATIONS (Some aspects of single-carrier transmission for E-UTRA, TSG-RAN WG1 #42, Ericsson, Aug. 29-Sep. 2, 2005).*
Japanese Office Action for Application No. 2006-009297, mailed on Jan. 11, 2011 (5 pages).
Ericsson, "Some Aspects of Single-Carrier Transmission for E-UTRA", 3GPP TSG-RAN WG1 #42, R1-050765, Sep. 2005.

(Continued)

*Primary Examiner* — Afshawn Towfighi
(74) *Attorney, Agent, or Firm* — Osha Liang LLP

(57) ABSTRACT

A transmission device according to an embodiment of the present invention includes a random access channel generation portion that generates a random access channel; an assignment portion that performs one of a continuous frequency assignment and a discontinuous comb-shaped frequency assignment for each user; and a transmission portion that transmits the random access channel with variable multi-bandwidth in accordance with the assignment, in a frequency band assigned to a contention-based channel.

24 Claims, 19 Drawing Sheets

(56) References Cited

OTHER PUBLICATIONS

International Search Report w/translation from PCT/JP2007/050179 dated Apr. 10, 2007 (4 pages).
Written Opinion from PCT/JP2007/050179 dated Apr. 10, 2007 (3 pages).
Office Action issued in related Russian Patent Application No. 2008132425/09(040623); Dated Jul. 3, 2010 (8 pages).
Keiji Tachikawa, "W-CDMA Mobile Communication System" Maruzen K.K., pp. 130-135, Jun. 25, 2001, 9 pages.
Chinese Office Action for Application No. 200780009523.0, mailed on Sep. 15, 2011 (18 pages).
esp@cenet Patent Abstract for Chinese Publication No. 1286580, publication date Mar. 7, 2001. (1 page).
esp@cenet Patent Abstract for Chinese Publication No. 1234169, publication date Nov. 3, 1999. (1 page).

* cited by examiner

5 MHz    FREQUENCY

ACCESS SLOT
=1.33 msec

TIME
AAA

ASSIGNED BANDWIDTH (E.G.,: 5 MHZ)  FREQUENCY

ASSIGNED BANDWIDTH (E.G.,: 5 MHZ)  FREQUENCY

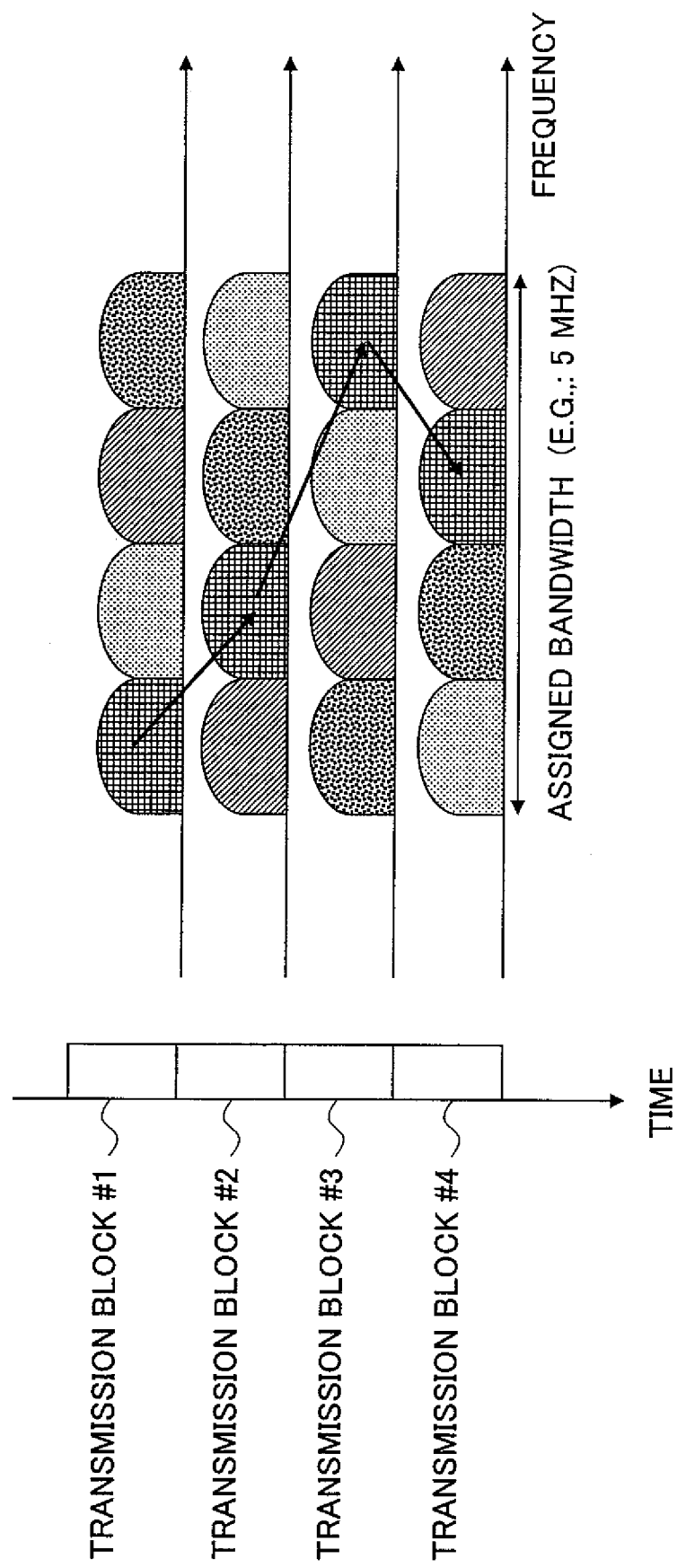

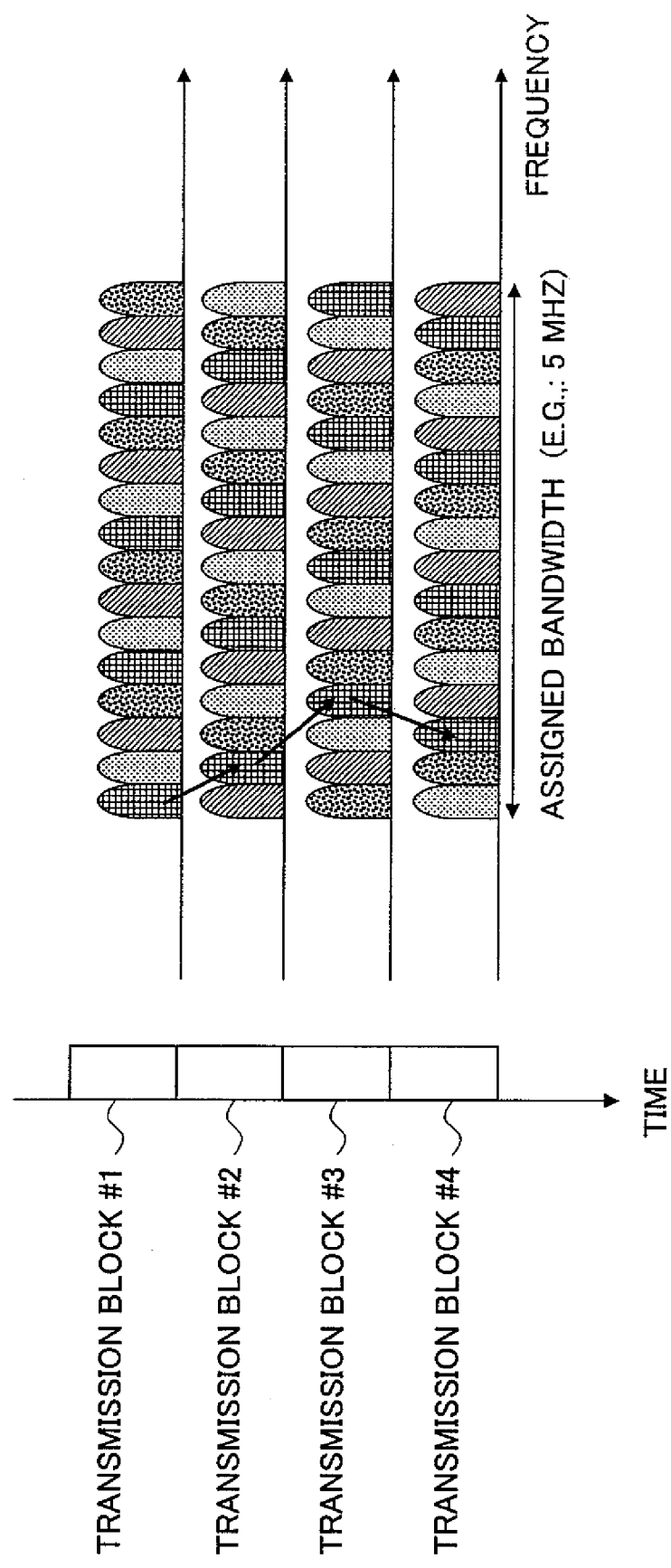

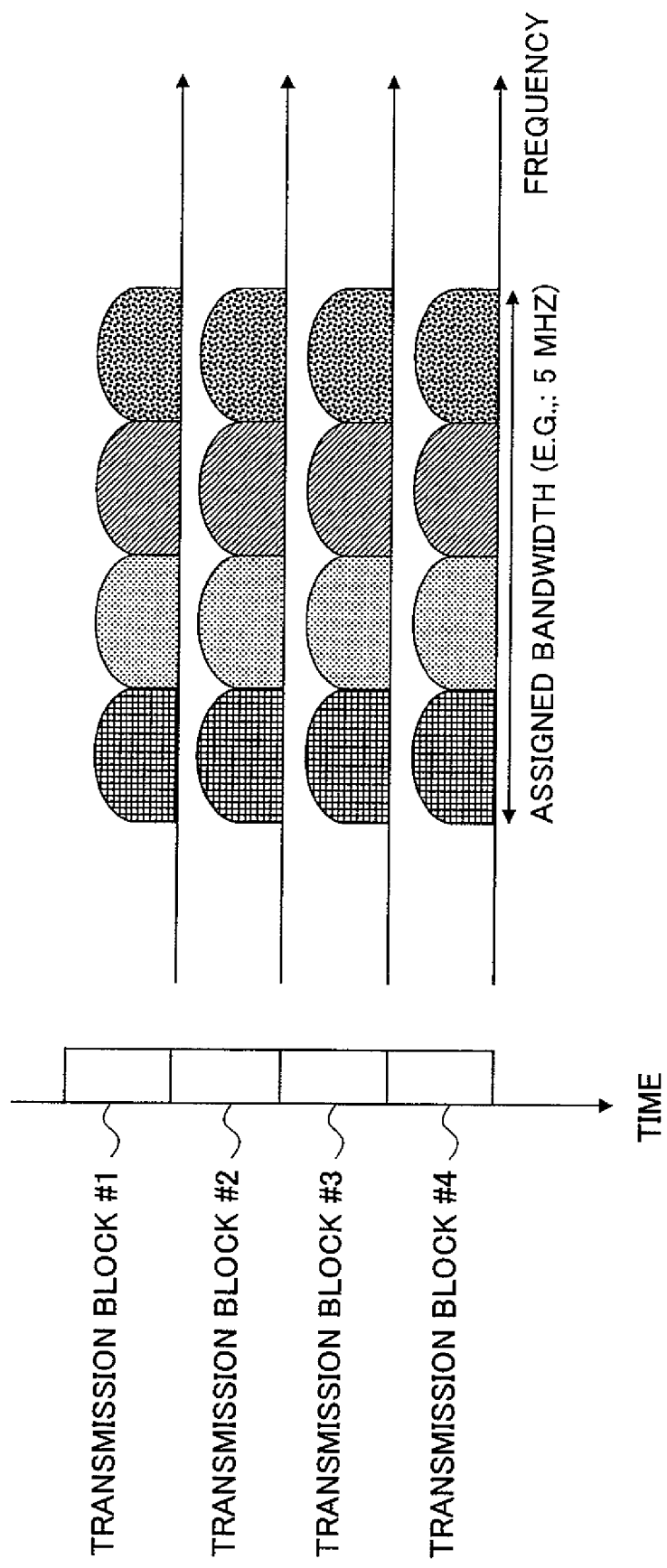

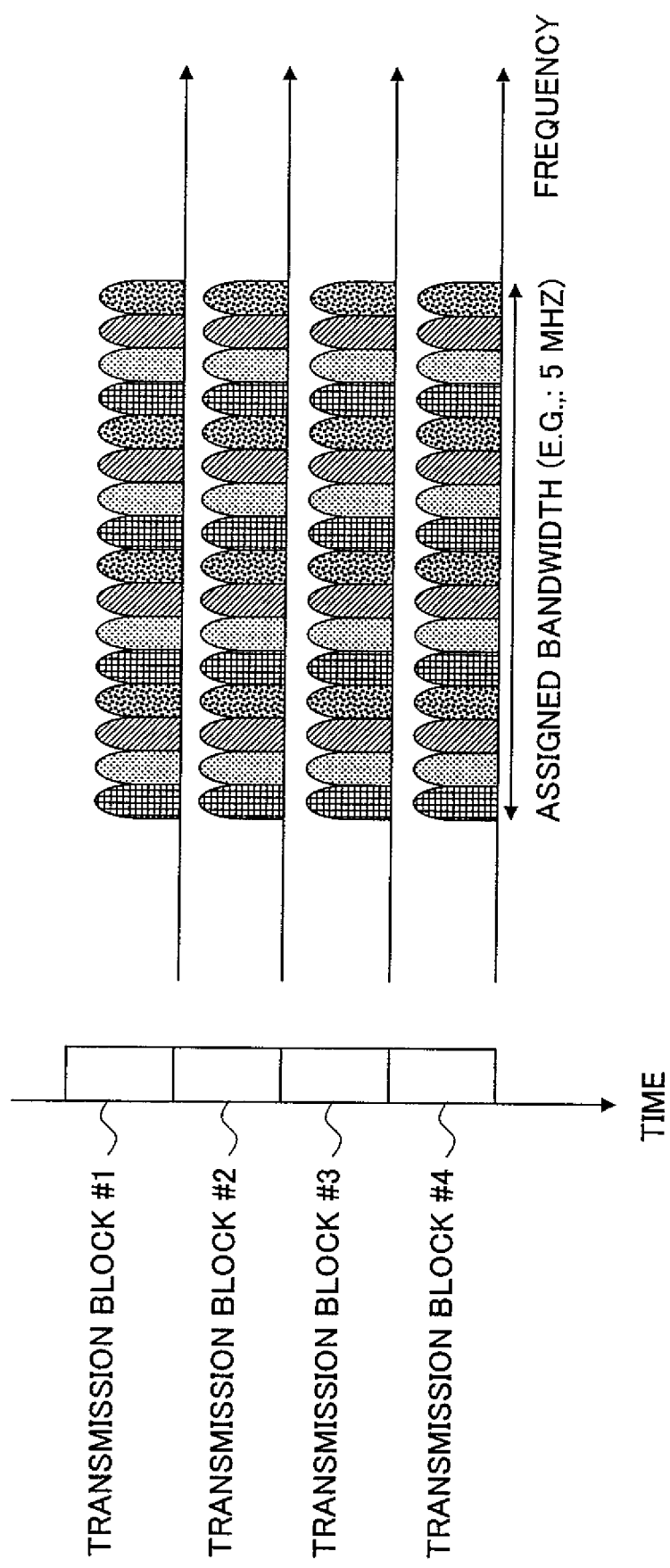

TRANSMISSION DEVICE, RECEPTION DEVICE AND RANDOM ACCESS CONTROL METHOD

TECHNICAL FIELD

The present invention relates to a transmission device, a reception device, and a random access control method.

BACKGROUND ART

As a successor of W-CDMA and HSDPA, a communications method called Evolved UTRA (E-UTRA) has been under considerations. E-UTRA is a radio access method that extendably supports plural bandwidths, and responds to a bandwidth from 1.25 MHz up to 20 MHz while assuring compatibility with an existing 3G system.

In the existing W-CDMA, a preamble of a random access channel used to establish an initial connection in uplink, which is one of contention-based channels, is transmitted by a combination of code-multiplexing and time-multiplexing.

For example, when users are multiplexed by code-multiplexing, a terminal device can choose any signature from plural prepared signatures (codes), as shown in FIG. 1A.

In addition, when the users are multiplexed by time-multiplexing, the terminal device can chose any access slot from plural prepared access slots, as shown in FIG. 1B.

W-CDMA random access is described in Non-patent Publication 1.

Non-patent Document 1: "Advanced Digital Mobile Communications", edited by Keiji Tachikawa, Kagaku-shimbun-sha., pp. 130-134.

SUMMARY OF INVENTION

Problem to be Solved by the Invention

In contrast, plural bandwidths are defined in an E-UTRA based system, and different bandwidths are supported by different base stations or business operators. In other words, a system managed by each operator (or a cell in a system of an identical operator, in some cases) provides different bandwidths to be used. In this circumstance, all the mobile terminal devices have to access any one of the base stations operating in different bandwidths.

Additionally, a single carrier Localized/Distributed FDMA radio access method has been under considerations as an uplink radio access method in the E-UTRA based system.

In order to solve the above problems, the present invention is directed to a transmission device, a reception device, and a radio access control method that are able to support users having plural bandwidths.

Means for Solving the Problem

In order to solve the above problems, a transmission device according to an embodiment of the present invention includes a random access channel generation portion that generates a random access channel; an assignment portion that performs one of a continuous frequency assignment and a discontinuous comb-shaped frequency assignment to each user; and a transmission portion that transmits the random access channel with variable multi-bandwidth in accordance with the assignment, in a frequency band assigned to a contention-based channel.

With such a configuration, the random access channel can be transmitted based on the Localized FDMA and/or the Distributed FDMA.

In addition, a reception device according to an embodiment of the present invention includes a reception portion that receives a random access channel for one or plural mobile stations; and a detection process portion that detects a preamble portion and an L1/L2 control portion from the random access channel.

With such a configuration, the random access channel including the preamble portion and the L1/L2 control message portion can be detected.

Moreover, a random access control method according to an embodiment of the present invention includes a random access channel generation step wherein a random access channel is generated; an assignment step wherein one of a continuous frequency assignment and a discontinuous comb-shaped frequency assignment to each user is performed; and a transmission step wherein the random access channel is transmitted with variable multi-bandwidth in accordance with the assignment.

With such a configuration, the random access channel can be transmitted based on the Localized FDMA and/or the Distributed FDMA.

Advantage of the Invention

According to an embodiment of the present invention, a transmission device, a reception device, and a radio access control method that are able to support users having plural bandwidths may be realized.

BRIEF DESCRIPTION OF THE DRAWINGS

FIG. 7 is an explanatory view of operations of the transmission device according to the embodiment of the present invention.

FIG. 8 is an explanatory view of operations of the transmission device according to the embodiment of the present invention.

FIG. 9 is an explanatory view of operations of the transmission device according to the embodiment of the present invention.

FIG. 10 is an explanatory view of operations of the transmission device according to the embodiment of the present invention.

LIST OF REFERENCE SYMBOLS

100: transmission device
200: reception device

BEST MODE FOR CARRYING OUT THE INVENTION

Referring to the accompanying drawings, preferable embodiments according to the present invention will be described based on the following examples. In all the drawings for explaining the examples, the same reference marks are used for portions having the same function, and repetitive explanations are omitted.

A radio communications system according to an example of the present invention includes a mobile station and a base station.

Uplink single carrier Localized/Distributed FDMA radio access methods are applied to the radio communications system according to this example of the present invention. The mobile station transmits a random access channel including a preamble and an L1/L2 control message portion when carrying out random access.

Figure 1A:
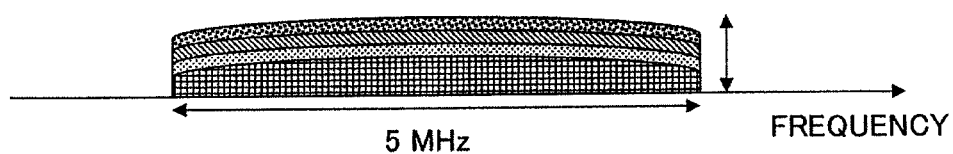
FIG. 1A is an explanatory view of a transmission method of a contention-based channel in W-CDMA.
Figure 1B:
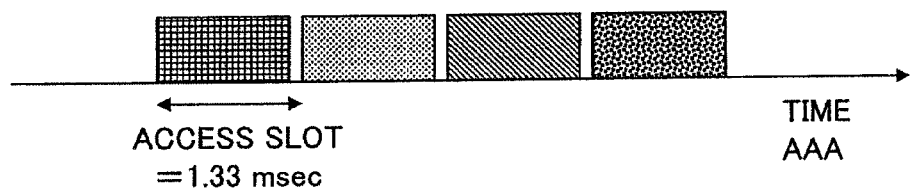
FIG. 1B is an explanatory view of a transmission method of a contention-based channel in W-CDMA.
Figure 2:
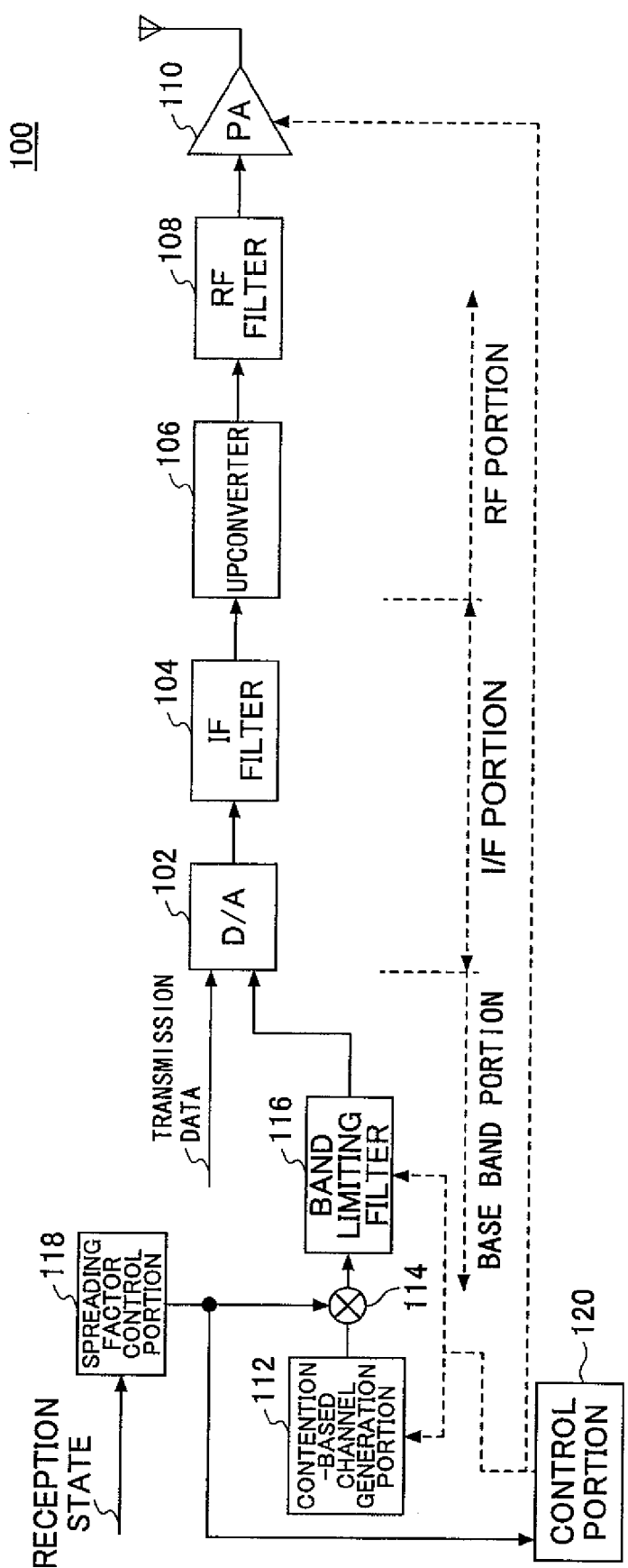
FIG. 2 is a partial block diagram of a transmission device according to an embodiment of the present invention.

Next, a transmission device 100 according to this example is explained in reference to FIG. 2.

The transmission device 100 according to this example is provided, for example, in the mobile station and uses the random access channel including the preamble portion and the L1/L2 control message portion when carrying out random access in the uplink single carrier Localized/Distributed FDMA radio access.

The transmission device 100 is provided with a D/A converter 102 to which transmission data are input, an IF filter 104 to which an output signal from the D/A converter is input, an upconverter 106 to which an output signal from the IF filter 104 is input, an RF filter 108 to which an output signal from the upconverter 106 is input, a power amplifier (PA) 110 to which an output signal from the RF filter 108 is input, a contention-based channel generation portion 112 as a random access channel generator, a multiplication portion 114 to which an output signal from the contention-based channel generation portion 112 is input, a band limiting filter 116 to which an output signal from the multiplication portion 114 is input, a control portion 120 as a burst length control portion, a transmission control portion, a transmission power control portion, and an assigning portion that controls the contention-based channel generation portion 112, the band limiting filter 116, and the PA 110, and a spreading factor control portion 118 as a transmission control portion that changes a spreading factor to be used for the random access channel.

The base-band processed random access channel is input to the D/A converter 102 of an IF portion and passes through the IF filter 104. An output signal from the IF filter 104 is input to the upconverter 106 of an RF portion, and frequency-converted to an RF frequency corresponding to an established uplink transmission frequency band. Part of these functions may be carried out in a base band portion. The RF-converted signal passes through the RF filter 108.

The output signal from the RF filter 108 is amplified by the PA 110. Generally, a transmission power control of an open loop type, which determines the transmission power of the random access channel, is carried out in accordance with the reception power of a downlink pilot channel. The amplified signal is transmitted through a transmission antenna.

Figure 3:
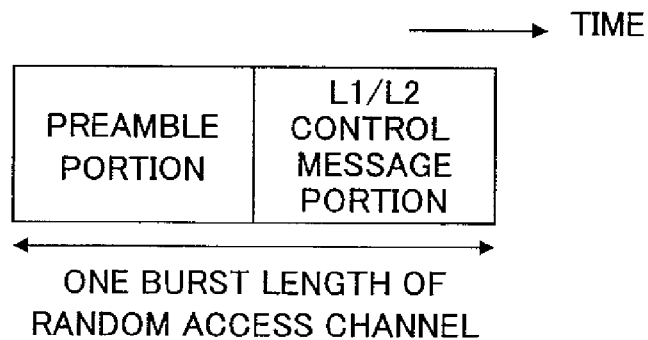
FIG. 3 is an explanatory view of a random access channel in the embodiment of the present invention.

The contention-based channel generation portion 112 generates a contention-based channel, for example, a random access channel (RACH), and outputs the contention-based channel to the multiplication portion 114. The random access channel transmitted by the transmission device 100 according to this example includes the preamble portion and the L1/L2 control message portion, as shown in FIG. 3. In this configuration of the random access, the preamble portion and the L1/L2 control message portion are transmitted continuously in time as one burst.

As stated, such continuous transmission of the preamble portion and the L1/L2 control message portion, or the preamble portion having the L1/L2 control message portion attached, can reduce delay time necessary to establish connection in uplink. As a result, a delay time necessary to transmit traffic data in a shared data channel following the random access channel can also be reduced.

The preamble portion in the random access channel is used to initially establish connection in uplink and includes a signature for discriminating/detecting plural random access channels.

With the preamble portion, the reception device (base station) carries out a reception timing measurement for controlling transmission timing in uplink and identifies a carrier frequency in the multi-bandwidth system. In addition, the preamble portion serves as a reference symbol for carrying out channel estimation in order to demodulate the L1/L2 control message portion.

Generally, different signals from plural users in uplink are unsynchronized when the signals are received by the base station because of relative positions between the mobile stations and the base station, even when the signals are transmitted at the same time by the plural users. However, the transmission timing control is carried out in the single carrier Localized/Distributed FDMA so that the reception signal can be received within a reception timing error of a cyclic prefix or less. With this, orthogonality of signals in the frequency domain between users in the same subframe is realized.

In addition, the transmission timing control is necessary in order to assign orthogonal radio resources in the time domain by packet scheduling.

Therefore, the base station carries out the transmission timing control by measuring the reception timing by use of the random access channel transmitted at the beginning in uplink.

Figure 4:
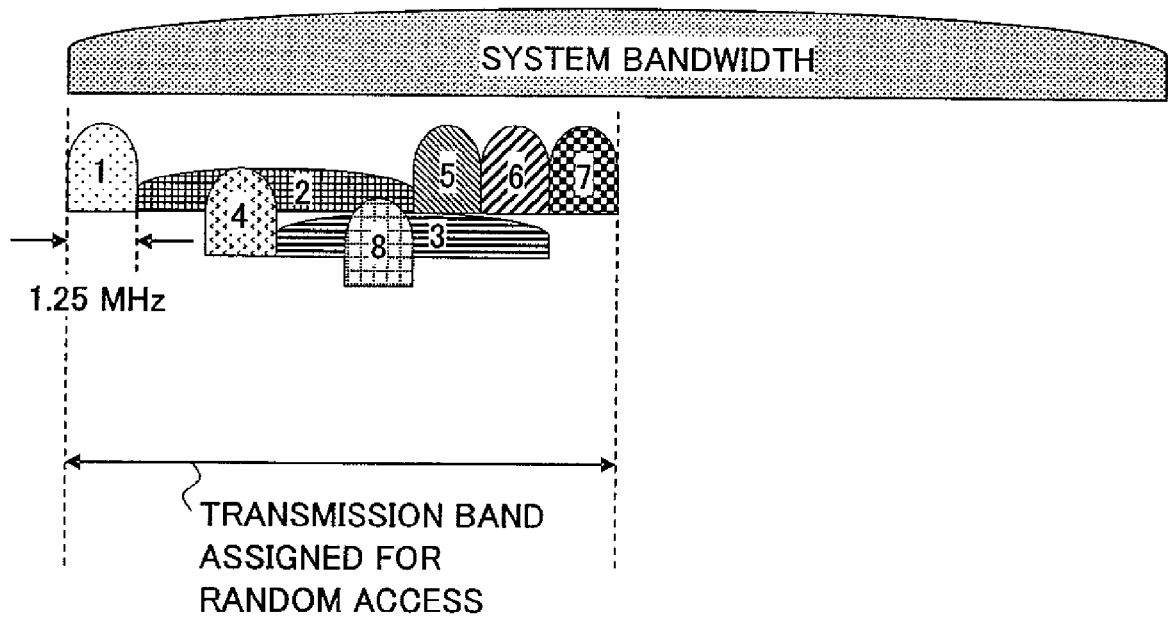
FIG. 4 is an explanatory view of random access employing bandwidths of 1.25 MHz and 5 MHz.

Additionally, in the multi-bandwidth system, the mobile station can choose any frequency band from plural prepared frequency bands in order to carry out the random access. In this case, the carrier frequency band chosen by the mobile station is identified. For example, each mobile station chooses a frequency band at random as shown in FIG. 4. In FIG. 4, a part of a system bandwidth of 20 MHz is assigned for the random access. FIG. 4 illustrates the random access where each mobile station randomly chooses a carrier frequency with a resolution of 1.25 MHz in the band assigned for random access and carries out the random access using a transmission bandwidth of 1.25 MHz or 5 MHz.

The L1/L2 control message portion in the random access channel stores control information for establishing connection and reservation information required to transmit data through the subsequent shared data channel. The transmission device 100 according to this example transmits the necessary minimum information for establishing the connection in uplink by the random access channel, and transmits traffic data and upper layer control information by the subsequent shared data channel.

The control information for establishing the connection may include a user ID, for example, a temporary user ID for the mobile station to carry out the random access. The reservation information required to transmit data by the shared data channel may include a data size, data QoS, information indicating, for example, a desired error rate, an allowable delay, a special call (emergency call) and the like, mobile station (UE) capability, and information indicating a transmittable bandwidth, a maximum transmission power, the number of antennas, and the like.

The multiplication portion 114 spreads the random access channel into a wide-band signal with a spreading code determined by the spreading factor control portion 118, and outputs the spread signal to the band limiting filter 116.

The spreading factor control portion 118 changes the spreading factor to be used for the random access channel in accordance with information indicating a reception state, i.e., an average reception state in the mobile station.

Conventionally, the mobile station measures the reception power of a downlink common pilot channel and carries out the open-loop transmission power control in accordance with the average reception state. For example, the mobile station reduces the transmission power when the reception state is good, while the mobile station increases the transmission power when the reception state is bad, or when the mobile station is far away from the base station. However, the transmission power control cannot always assure predetermined quality in the base station because of limitations of the maximum transmission power. Therefore, not only the transmission power but also the spreading factor is changed at the same time in the random access channel.

The spreading factor control portion 118 chooses the spreading factor from plural spreading factors defined in advance for the random access channel in accordance with the reception state. For example, the spreading factor control portion 118 chooses a large spreading factor when the reception state is bad, while the spreading factor control portion 118 chooses a small spreading factor when the reception state is good. Namely, the spreading factor control portion 118 carries out variable spreading factor control. The spreading factor control portion 118 carries out the spreading factor control for at least one of the preamble portion and the L1/L2 control message portion.

In addition, the spreading factor control portion 118 outputs information indicating the chosen spreading factor to the control portion 120.

Figure 5:
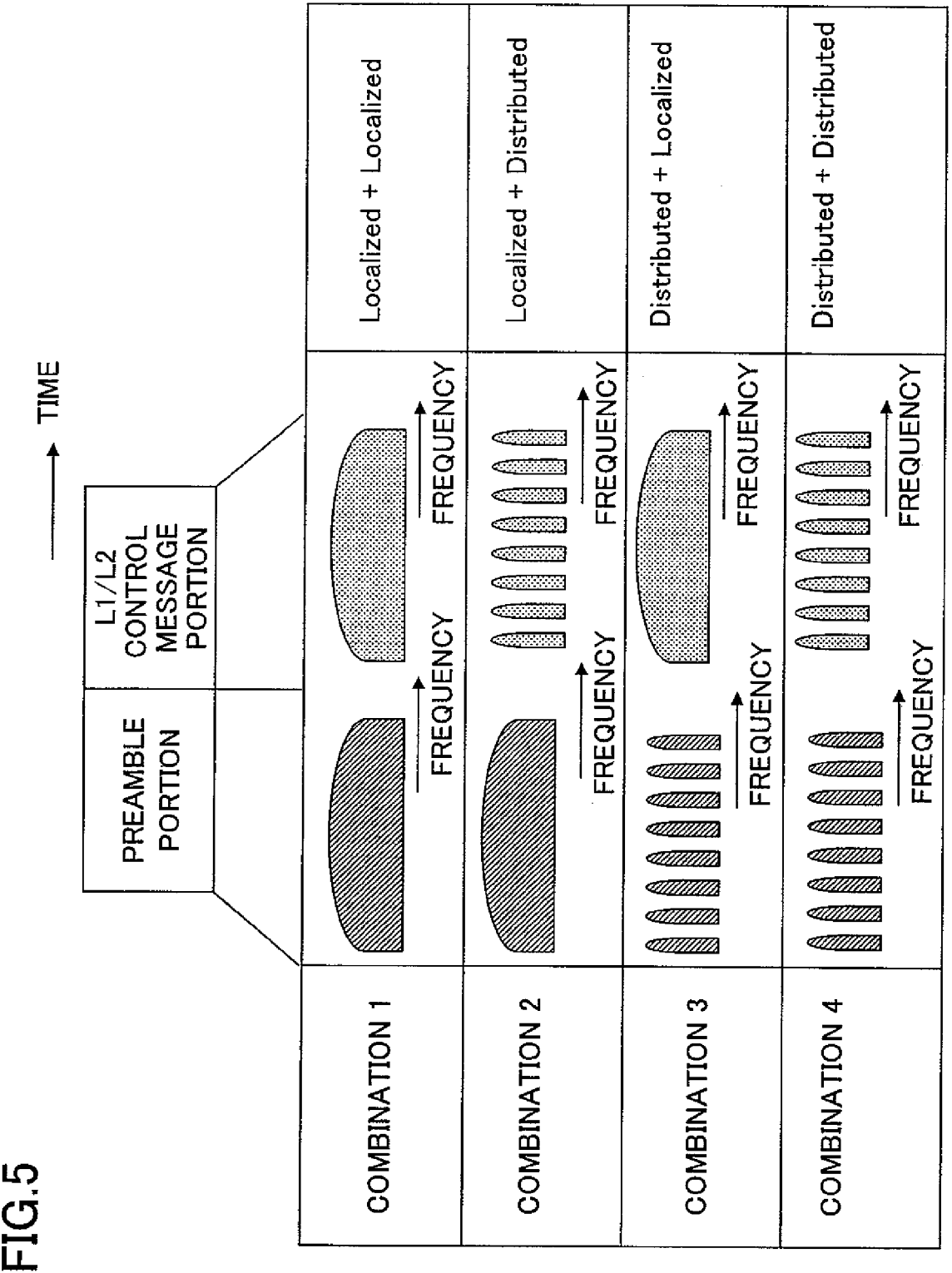
FIG. 5 is an explanatory view of configuration of a preamble portion and an L1/L2 control message portion of the random access channel.
Figure 6A:
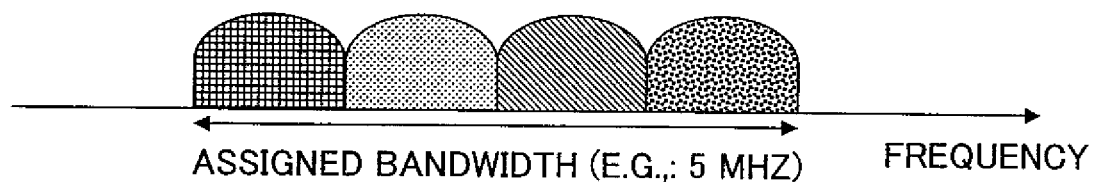
FIG. 6A is an explanatory view of operations of the transmission device according to the embodiment of the present invention.

The control portion 120 arbitrarily chooses a continuous frequency band for the preamble portion and the L1/L2 control message portion (Localized FDMA) from the plural continuous frequency bands prepared in advance in the band assigned to the random access channel, as shown in FIG. 5. (COMBINATION 1). For example, the control portion 120 may choose a divided assigned band from plural continuous bands into which the assigned band has been divided. When the assigned band has a width of 5 MHz as shown in FIG. 6A, the control portion 120 chooses a divided assigned band of 1.25 MHz, which is obtained by dividing the assigned band of 5 MHz into four bands. Additionally, when the assigned band has a width of 2.5 MHz, the control portion 120 chooses a divided assigned band of 1.25 MHz, which is obtained by dividing the assigned band of 2.5 MHz.

Figure 6B:
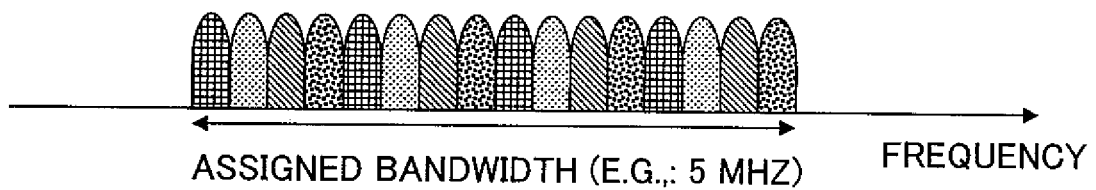
FIG. 6B an explanatory view of operations of the transmission device according to the embodiment of the present invention.

Moreover, the control portion 120 may choose a frequency band for the preamble portion in accordance with the Localized FDMA method and an arbitrary one of comb-shaped frequency bands for the L1/L2 control message portion from plural comb-shaped frequency bands prepared in advance (Distributed FDMA) (COMBINATION 2). For example, the control portion 120 chooses a divided assigned band which is obtained by dividing the assigned band into plural comb-shaped bands. For example, when the assigned band has a width of 5 MHz as shown in FIG. 6B, the control portion 120 chooses any one of the comb-shaped bands among four comb-shaped bands prepared in the 5 MHz band. As a result, the comb-shaped frequency band where frequencies to be used appear at intervals of 1.25 MHz over the assigned band width is assigned to the L1/L2 control message portion.

When the frequency band is chosen for the preamble portion in accordance with the Localized FDMA method, detection accuracy can be improved compared to where the comb-shaped frequency band is allocated, because sidelobes that may cause detection error of the reception timing in correlation detection in the reception device do not appear. In addition, the L1/L2 control message portion is transmitted through the comb-shaped frequency band spread over the band assigned to the random access channel, thereby enabling high quality signal transmission of the L1/L2 control message portion because of frequency diversity effect.

Additionally, the control portion 120 may choose the comb-shaped frequency band for the preamble portion in accordance with the Distributed FDMA method, and the frequency band for the L1/L2 control message portion in accordance with the Localized FDMA method (COMBINATION 3).

Moreover, the control portion 120 may choose the comb-shaped frequency band for the preamble portion and the L1/L2 control message portion in accordance with the Distributed FDMA method (COMBINATION 4).

Furthermore, the control portion 120 may choose the frequency band and the comb-shaped frequency band for the preamble and the L1/L2 control message portion by a combination of the Localized FDMA method and the Distributed FDMA method, and a simultaneous use of these methods, code-multiplexing, and time-multiplexing (access slot) is possible.

In addition, the control portion 120 may choose the frequency band to be assigned by combining the Localized FDMA method and frequency hopping, when the random access channel is transmitted using plural transmission blocks divided in the time domain. In this case, the control portion 120 may choose any pattern from frequency hopping patterns provided through a downlink control channel, which have been determined in advance by the base station. In this case, the control portion 120 changes the frequency band to be assigned every transmission block in accordance with the determined pattern. With this, the frequency diversity effect can be enhanced. Moreover, simultaneous use of the code-multiplexing and time-multiplexing (access slot) is possible.

Moreover, when the control portion 120 uses the plural frequency blocks divided in the time domain in order to transmit the random access channel, the control portion 120 may choose the comb-shaped frequency band to be assigned by combining the Distributing FDMA method and the frequency hopping. In this case, the control portion 120 changes the comb-shaped frequency band every transmission block in accordance with a predetermined pattern, as shown in FIG. 8. For example, any pattern can be chosen from the plural frequency hopping patterns prepared in advance. Moreover, simultaneous use of the code-multiplexing and time-multiplexing (access slot) is possible.

When the frequency hopping is employed, the hopping pattern may be part of the signature and can be used in order to identify the plural random access channels.

Furthermore, when the frequency hopping and the code-multiplexing are employed, a product of the number of the hopping patterns and the number of the codes is the number of the signatures, which enables identification of the random access channels whose number corresponds to the maximum number of the signatures.

Additionally, when the control portion 120 uses the plural transmission blocks divided in the time domain in order to transmit the random access channel, the control portion 120 may always choose the same frequency band in accordance with the Localized FDMA method. In this case, the same frequency band is used for every transmission block, as shown in FIG. 9. For example, the control portion 120 chooses any frequency band from the plural prepared frequency bands. With this, channel estimation is carried out only for the same frequency band, thereby improving channel estimation accuracy. In addition, because a carrier frequency to be used for transmission is fixed and there is no need to change the carrier frequency every transmission block, the reception device may be simply configured. Moreover, simultaneous use of the code-multiplexing and time-multiplexing (access slot) is possible.

Moreover, when the control portion 120 uses the plural transmission blocks divided in the time domain in order to transmit the random access channel, the control portion 120 may always choose the same comb-shaped frequency band in accordance with the Distributed FDMA method. In this case, the same comb-shaped frequency band is used for transmission every transmission block, as shown in FIG. 10. For example, any one of the plural comb-shaped frequency bands prepared in advance is chosen. With this, the transmission frequency is limited and there is no need to change the carrier frequency every transmission block, thereby simplifying the reception device configuration. Even in this case, simultaneous use of the code-multiplexing and time-multiplexing (access slot) is possible.

In addition, when the spreading factor and the transmission power to be used for the random access channel are changed depending on the average reception state of the mobile station, the control portion 120 may change a burst length of the random access channel.

When the spreading factor becomes larger while keeping the same burst length, a feasible data rate and the number of control bits that can be transmitted through the L1/L2 control message portion are reduced, which may make it impossible to transmit the predetermined control bits.

Therefore, the burst length of the random access channel is changed in accordance with the variable spreading factor control.

The control portion 120 controls the length of the L1/L2 control message portion in the random access channel in accordance with the input information indicating the spreading factor. For example, the control portion 120 increases the length of the L1/L2 control message portion when the spreading factor is large, and decreases the length of the L1/L2 control message portion when the spreading factor is small. In this case, a relationship between the spreading factor and the length of the L1/L2 control message portion may be determined in advance, thereby simplifying procedures in the reception device.

In addition, the control portion 120 may change the length of the preamble portion in addition to the length of the L1/L2 control message portion, in accordance with the spreading factor.

Moreover, the control portion 120 may change the transmission bandwidth for use in the random access channel in accordance with the average reception state of the mobile station. As a result, the transmission bandwidth and the transmission power for use in the random access channel are changed in accordance with the average reception state of the mobile station.

The control portion 120 chooses the transmission bandwidth from the plural transmission bandwidths defined in advance for the random access channel in accordance with the reception state. For example, the control portion 120 chooses a narrow transmission bandwidth when the reception state is bad, and a wide transmission bandwidth when the reception state is good.

Even when the reception state is bad, a predetermined transmission quality can be achieved because the transmission bandwidth is made narrow and the transmission power is concentrated on the bandwidth.

In addition, when the transmission bandwidth and the transmission power for use in the random access channel are changed in accordance with the average transmission state of the mobile station, the control portion 120 may change the length of the random access channel burst.

When the transmission bandwidth is reduced while keeping the same burst length, a feasible data rate and the number of the control bits that can be transmitted by the L1/L2 control message portion are reduced, which may make it impossible to transmit the predetermined control bits.

Therefore, the burst length of the random access channel is changed in accordance with the transmission bandwidth control.

The control portion 120 controls the length of the L1/L2 control message portion in the random access channel in accordance with the chosen transmission bandwidth. For example, the control portion 120 increases the length of the L1/L2 control message portion when the transmission bandwidth is small, and decreases the length of the L1/L2 control message portion when the transmission bandwidth is large. In this case, a relationship between the transmission bandwidth and the length of the L1/L2 control message portion may be determined in advance, thereby simplifying procedures in the reception device.

In addition, the control portion 120 may change the length of the preamble portion in accordance with the transmission bandwidth, in addition to the length of the L1/L2 control message portion.

The transmission bandwidth, the spreading factor, and the transmission power for use in the random access channel may be changed in accordance with the average reception state of the mobile station.

Figure 11:
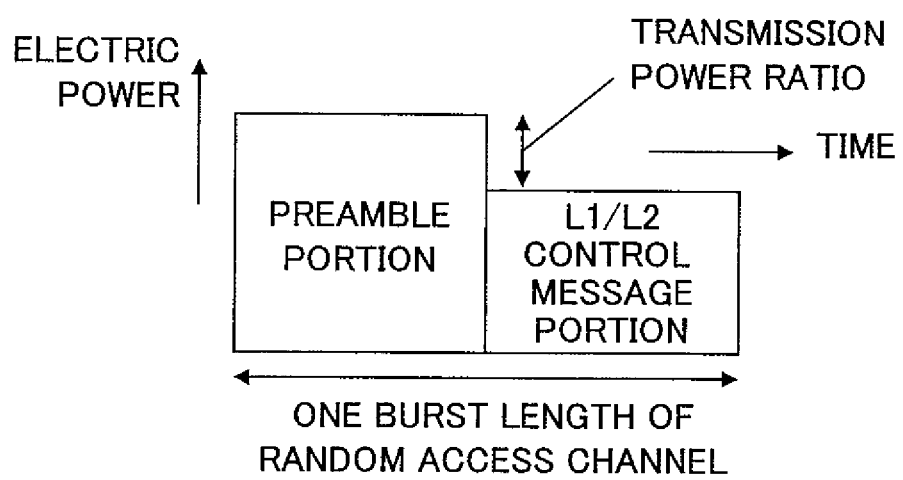
FIG. 11 is an explanatory view of transmission power control for the preamble portion and the L1/L2 control message portion in the random access channel.

Moreover, the control portion 120 may variably control a transmission power ratio between the preamble portion and the L1/L2 control message portion. For example, the control portion 120 sets an appropriate transmission power ratio, depending on the predetermined detection accuracy of the preamble portion and the predetermined accuracy of detection/demodulation of the L1/L2 control message portion, as shown in FIG. 11. Namely, the transmission power ratio is variably controlled. With this, multi-access interference between the random access channels, which is caused by unnecessary emission of power, and interference affecting adjacent cells can be reduced.

The transmission power ratio between the preamble portion and the L1/L2 control message portion in the random access channel is provided, for example, by control information from the base station.

Figure 12:
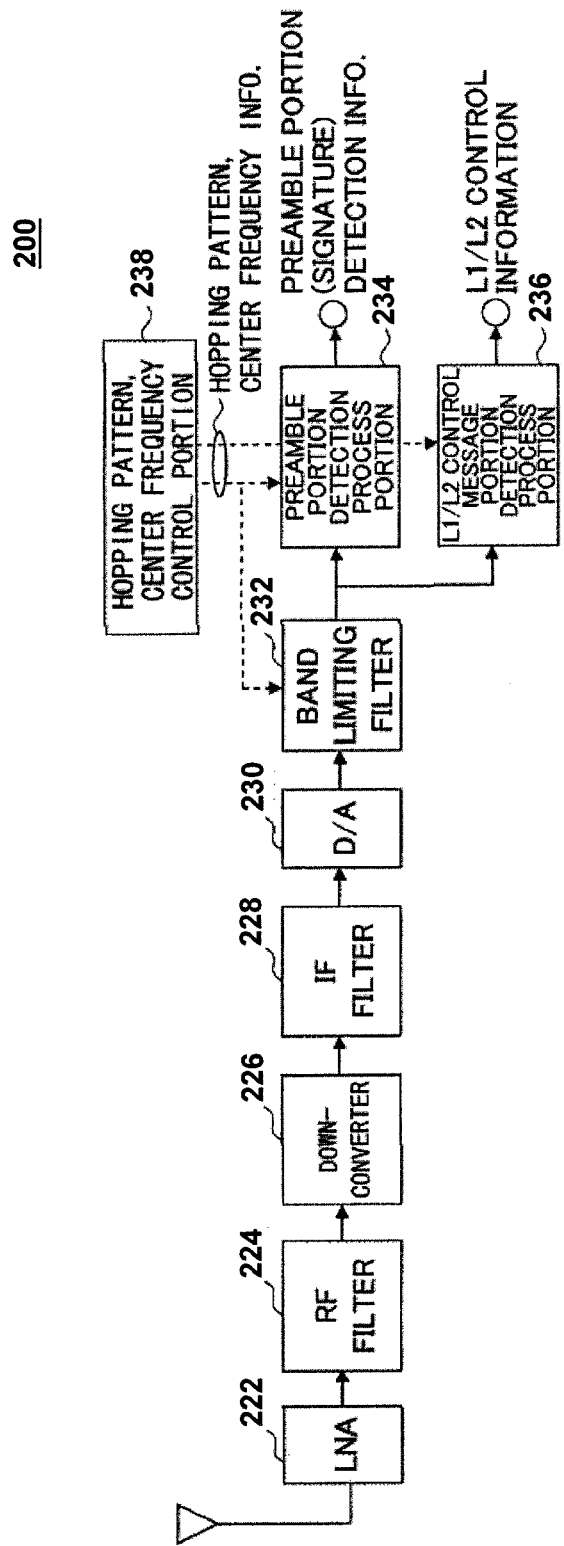
FIG. 12 is a partial block diagram of a reception device according to an embodiment of the present invention.

Next, a reception device 200 according to an example of the present invention is described in reference to FIG. 12.

The reception device 200 is provided in, for example, the base station and includes a low noise amplifier (LNA) 222 having an antenna, an RF filter 224 to which an output signal of the LNA 222 is input, a downconverter 226 to which an output signal of the RF filter 224 is input, an IF filter 228 to which an output signal of the downconverter 226 is input, a D/A converter 230 to which an output signal of the IF filter 226 is input, a band limiting filter 232 to which an output signal of the D/A converter 230 is input, a preamble portion detection process portion 234 which an output signal of the band limiting filter 232 is input to and serves as a detection processor, an L1/L2 control message portion detection portion 236 which an output signal of the band limiting filter 232 is input to and serves as a detection processor, and a hopping pattern center frequency control portion 238 serving as a controller that controls the band limiting filter 232, the preamble portion detection process portion 234, and the L1/L2 control message portion detection portion 236.

A reception signal is amplified in the LNA 222 in order to obtain amplitude suitable for a subsequent process, and output to the downconverter 226. The downconverter 226 generates a signal whose frequency is reduced to an intermediate frequency (IF) from the amplified reception signal, and outputs the IF signal to the IF filter 228. The IF filter 228 limits the IF signal to a specific frequency band of the reception signal. The limited signal is input to the D/A converter 230, band-limited by the band limiting filter 232, and input to the preamble portion detection process portion 234 and the L1/L2 control message portion detection portion 236.

The hopping pattern center frequency control portion 238 controls the band limiting filter 232, the preamble portion detection portion 234, and the L1/L2 control message portion detection portion 236 in accordance with information on the known center frequency and hopping pattern by which the base station carries out assignments for the random access channel.

The preamble portion detection process portion 234 detects the preamble portion and outputs detection information on the preamble portion (signature). Additionally, the L1/L2 control message detection process portion 236 detects the L1/L2 control message portion and outputs the L1/L2 control information.

Figure 13:
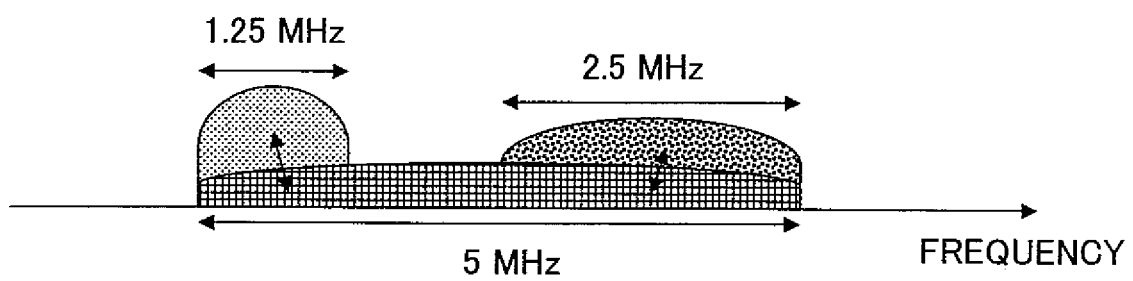
FIG. 13 is an explanatory view of operations of the reception device according to the embodiment of the present invention.

The preamble portion detection process portion 234 detects the preamble portion from the received random access channel and demodulates the detected preamble. Plural mobile stations choose one of the plural codes in order to transmit the random access channel. For example, when the plural mobile stations choose different codes and transmit the random access channels, the preamble signal produced by applying different spreading series (signatures) to corresponding preamble portions and multiplexing the spread preamble portions is input to the preamble portion detection process portion 234, as shown in FIG. 13. In addition, the preamble portion detection process portion 234 detects all the patterns whose number corresponds to a product of the number of the codes and the frequency bands because each mobile station may transmit the random access channels using different frequency bands.

Figure 14:
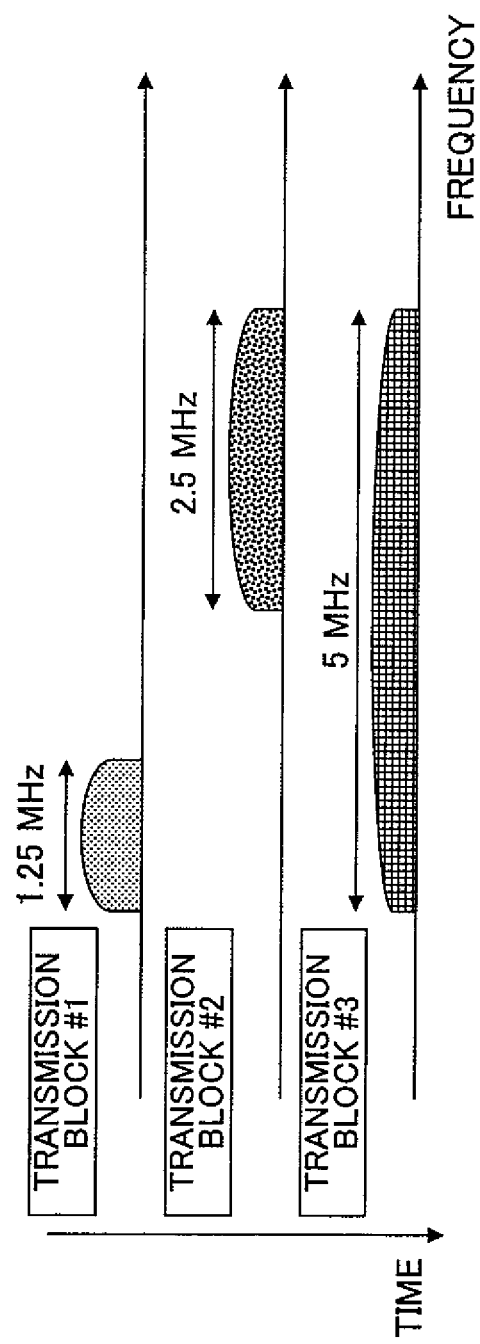
FIG. 14 is an explanatory view of operations of the reception device according to the embodiment of the present invention.

Moreover, when each mobile station transmits the random access channels using different frequency bands every transmission block or access slot as shown in FIG. 14, the preamble portion detection process portion 234 detects all the patterns whose number corresponds to a product of the number of the codes and the frequency bands every transmission block or access slot. For example, the mobile station transmits the random access channel in a bandwidth of 1.25 MHz at a transmission block #1, the random access channel in a bandwidth of 2.5 MHz at a transmission block #2, and the random access channel in a bandwidth of 5 MHz at a transmission block #3. With this, the number of patterns to be detected can be reduced in each transmission block or access slot.

Figure 15:
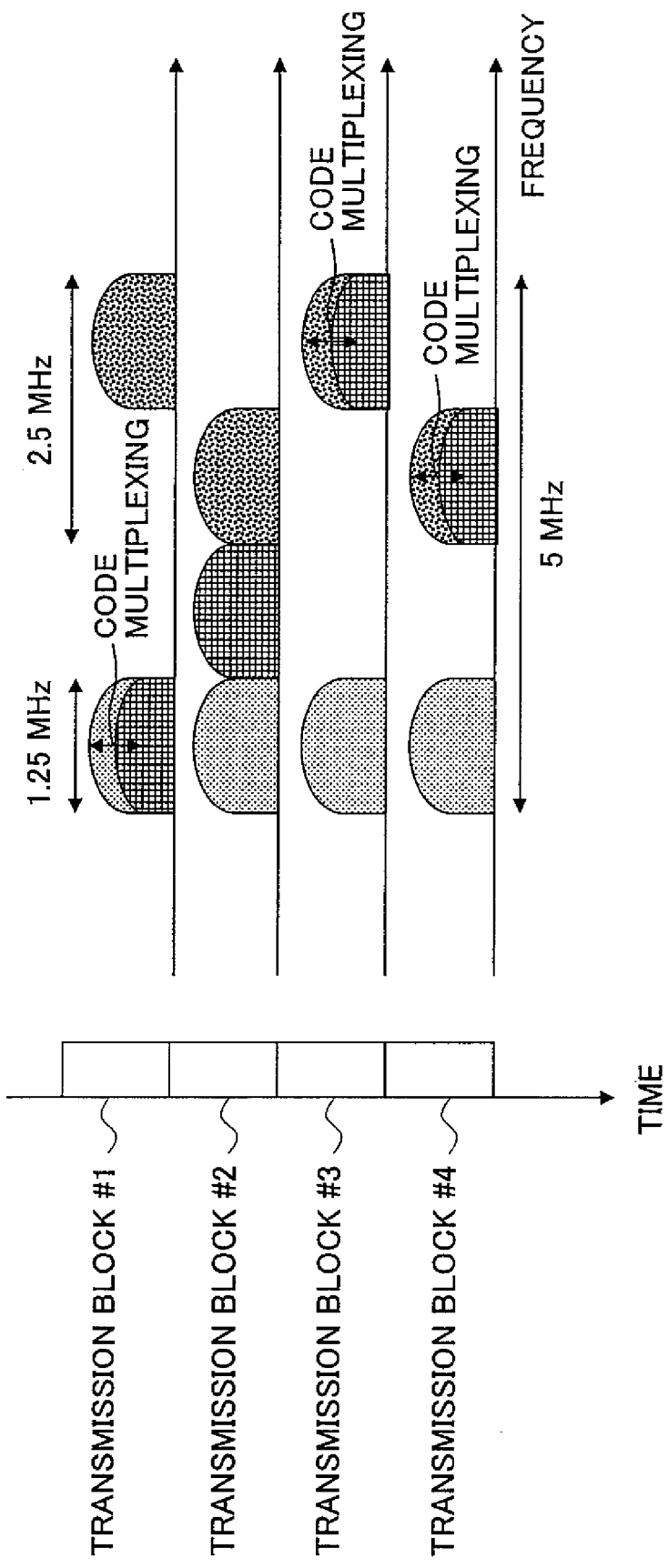
FIG. 15 is an explanatory view of operations of the reception device according to the embodiment of the present invention.

In addition, when each mobile station transmits the random access channel in the minimum bandwidth of, for example, 1.25 MHz using the combination of the Localized FDMA method and the frequency hopping, the different mobile stations may choose the different codes, as shown in FIG. 15. In this case, the preamble signal produced by applying different spreading series (signatures) to corresponding preamble portions and multiplexing the spread preamble portions is input to the preamble portion detection process portion 234, as shown in FIG. 15. The preamble portion detection process portion 234 detects the patterns whose number corresponds to the number of the codes. With this, the number of patterns to be detected can be reduced in each transmission block or access slot.

Moreover, because the mobile station carries out transmission by frequency hopping, the reception device 200 can use the same detection circuit as used for the preamble of the 1.25 MHz band, even when the preamble of the 5 MHz band is allowed in the reception device 200.

Figure 16:
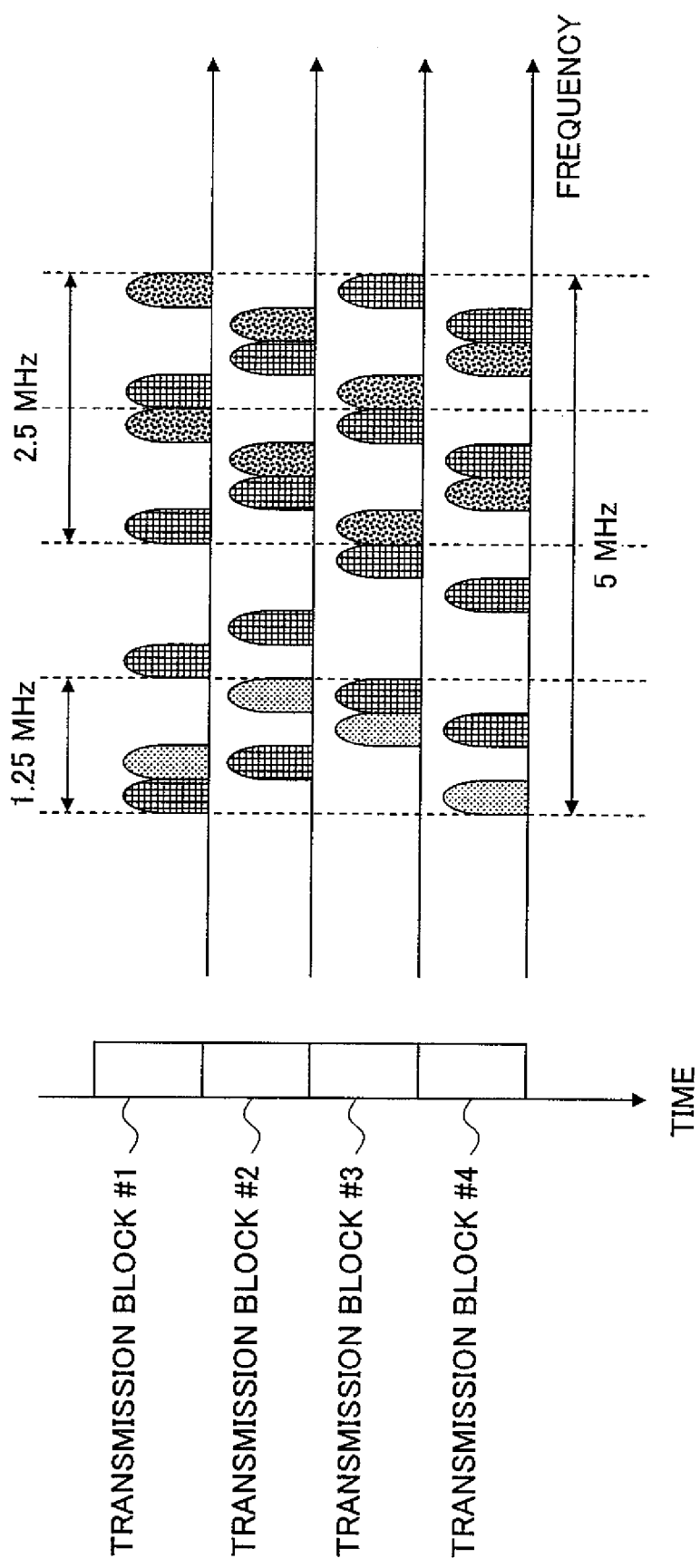
FIG. 16 is an explanatory view of operations of the reception device according to the embodiment of the present invention.

When each mobile station transmits the random access channel in accordance with the Distributed FDMA method as shown in FIG. 16, the preamble portion detection process portion 234 detects the patterns whose number is the same as the number of the codes. With this, the number of patterns to be detected can be reduced in each transmission block or access slot. This can be applied even when each mobile station carries out transmission through the simultaneous use of code multiplexing and time multiplexing (access slot).

The L1/L2 control message portion detection process portion 236 has the same function as the preamble portion detection process portion 234.

Figure 17:
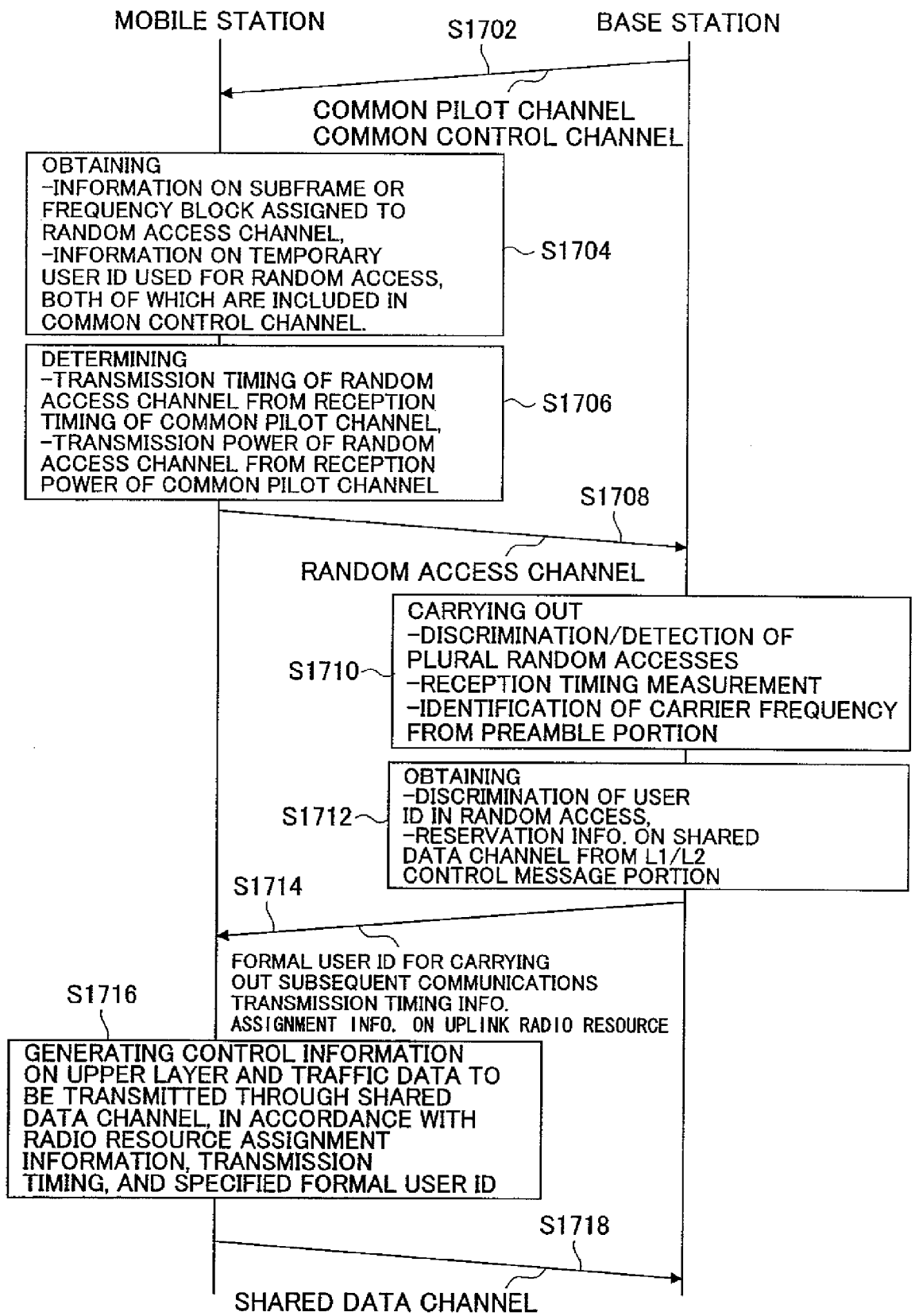
FIG. 17 is a flow diagram of operations of a radio communications system according to an embodiment of the present invention.

Next, operations of the radio communications system according to an example of the present invention are described in reference to FIG. 17.

The base station periodically transmits a common pilot channel and a common control channel to the mobile station (step S1702).

Then, the mobile station obtains at least one of information indicating a transmission power ratio, information on a temporary user ID to be used in the random access, information on a position of a comb tooth in the Distributed FDMA method, and information on the frequency block or the subframe assigned to the random access channel included in the common control channel (step S1704).

Next, the mobile station determines the transmission timing of the random access channel for the reception timing of the common pilot channel, and the transmission power of the random access channel and the spreading factor from the reception power of the common pilot channel (step S1706).

Next, the mobile station transmits the random access channel (step S1708).

Next, the base station carries out discrimination/detection of the plural random accesses, measurement of the reception timing for transmission timing, and identification of the carrier frequency (step S1710) from the preamble portion.

Next, the base station obtains discrimination of the temporary user ID in the random access and reservation information for the shared data channel (step S1712).

Next, the base station transmits assignment information on an uplink radio resource, transmission timing information, and a formal user ID for carrying out subsequent communications, to the assigned user (step S1714).

Next, the mobile station generates upper layer control information and traffic data to be transmitted through the shared data channel in accordance with the radio resource assignment information, the transmission timing, and the specified formal user ID (step S1716).

Next, the mobile station transmits the shared data channel (step S1718).

Figure 18:
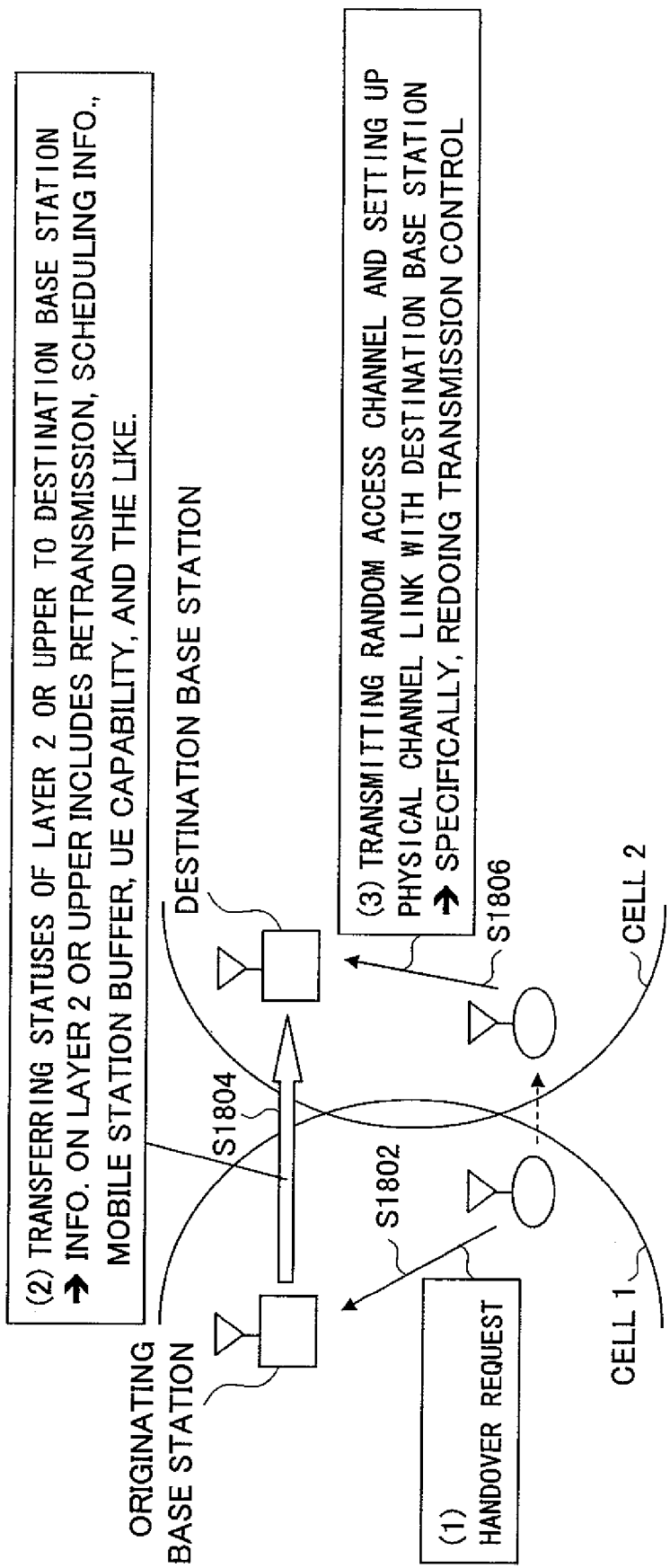
FIG. 18 is an explanatory view of operations performed at the time of handover in the embodiment of the radio communications system according to the embodiment of the present invention.

Next, handover operations in the radio communications system according to this example are described in reference to FIG. 18.

In the radio communications system according to this example, statuses of layer 2 or upper are maintained between the originating base station (Node-B) and a destination base station when the handover is carried out. In a cell of the destination base station, the mobile station sets up a physical layer channel again, using the random access channel.

The mobile station makes a handover request to the originating base station (step S1802).

The originating base station transfers the statuses of the layer 2 or upper to the destination base station (step S1804). For example, the originating base station transmits the control information on the layer 2 or upper to the destination base station through a cable transmission line. The information on the layer 2 or upper includes information indicating a packet being retransmitted, information on scheduling, information indicating a mobile station buffer and mobile station (UE) capability, or the like.

Next, the mobile station transmits the random access channel to the destination base station, and sets up a physical channel link to the destination base station (step S1806). Specifically, the mobile station redoes the transmission timing control. The transmission timing control is carried out exclusively in each cell. Therefore, the mobile station moving over cells is required to redo the transmission timing control in the cell of the destination base station.

Figure 19:
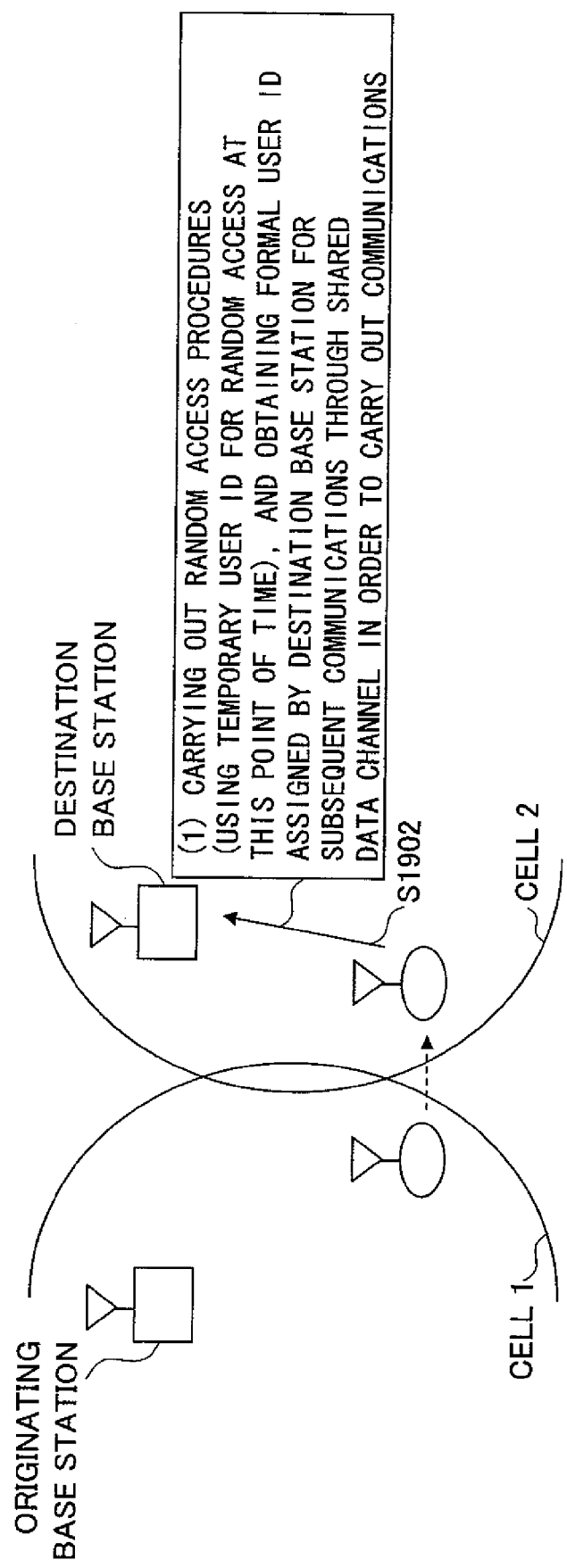
FIG. 19 is an explanatory view of operations performed at the time of handover in the embodiment of the radio communications system according to the embodiment of the present invention.
Figure 20:
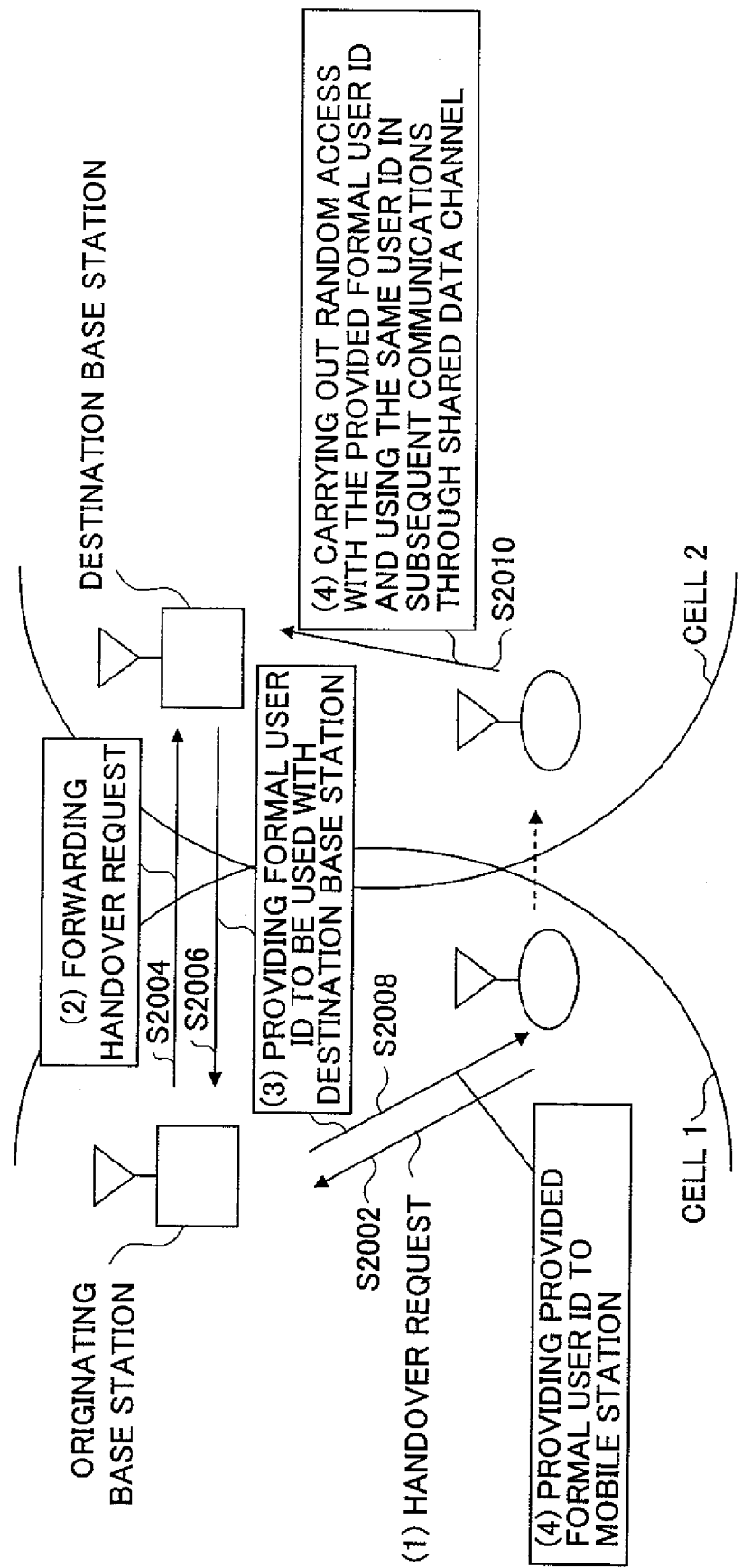
FIG. 20 is an explanatory view of operations performed at the time of handover in the embodiment of the radio communications system according to the embodiment of the present invention.

In addition, a random access channel process when the handover is carried out is described in reference to FIGS. 19 and 20.

A mobile station in handover obtains a user ID to be used with the destination base station directly from the destination base station.

In this case, the mobile station uses the temporary user ID for the random access in order to carry out the above random access procedures in the destination cell (step S1902), as shown in FIG. 19. The destination base station assigns the formal user ID to be used in subsequent transmissions of the shared data channel.

Alternatively, the mobile station in handover may obtain the formal user ID to be used with the destination base station in advance through the originating base station.

The mobile station makes the handover request to the originating base station (step S2002).

The originating base station forwards the received handover request to the destination base station (step S2004).

The destination base station provides the formal user ID to be used to the originating base station (step S2006).

The originating base station provides the provided formal user ID to be used with the destination base station to the mobile station (step S2008).

The mobile station moves into an area covered by the destination base station and carries out the random access by use of the provided formal user ID to be used with the destination base station (step S2010). The same user ID is used for subsequent transmissions of the shared data channel.

This international patent application is based on Japanese Priority Application No. 2006-009297, filed on Jan. 17, 2006, with the Japanese Patent Office, the entire contents of which are hereby incorporated by reference.

INDUSTRIAL APPLICABILITY

A transmission device, a reception device, and a random access method according to the present invention can be applied to a radio communications system.

The invention claimed is:

1. A transmission device comprising:
    a random access channel generation portion that generates a random access channel including a preamble portion and an L1/L2 control message portion;
    an assignment portion that performs one of a continuous frequency assignment and a discontinuous comb-shaped frequency assignment for each user in a frequency band assigned to a contention-based channel; and
    a transmission portion that transmits the random access channel with variable multi-bandwidth in accordance with the assignment by transmitting the preamble portion and the L1/L2 control message portion continuously in time as one burst with no time delay between the preamble portion and the L1/L2 control message portion.

2. The transmission device of claim 1, wherein the preamble portion is used for at least one of a channel estimation for demodulation of the L1/L2 control message portion, identification of a carrier frequency in a multi-bandwidth system, and a reception timing measurement for an uplink transmission timing control.

3. The transmission device of claim 1, wherein the L1/L2 control message portion stores control information for link establishment, and reservation information necessary to transmit data through a subsequent shared data channel.

4. The transmission device of claim 1, wherein the assignment portion assigns any one of plural continuous divided assigned bands into which an assigned band is divided, when the continuous frequency assignment is performed.

5. The transmission device of claim 4, wherein the assignment portion assigns a different one of the plural continuous divided assigned bands per transmission block.

6. The transmission device of claim 1, wherein the assignment portion assigns any one of plural comb-shaped divided assigned bands into which an assigned band is divided, when the discontinuous comb-shaped frequency assignment is performed.

7. The transmission device of claim 6, wherein the assignment portion assigns a different one of the plural divided assigned band per transmission block.

8. The transmission device of claim 1, further comprising a transmission power control portion that controls a transmission power ratio between the preamble portion and the L1/L2 control message portion.

9. The transmission device of claim 1, further comprising a transmission control portion that controls at least one of a transmission bandwidth and a spreading factor that spreads the random access channel.

10. The transmission device of claim 9, further comprising a burst length control portion that changes a burst length of the random access channel in accordance with at least one of the spreading factor and the transmission bandwidth.

11. The transmission device of claim 1, wherein the random access channel generation portion generates the random access channel in a handover destination cell when handover is performed.

12. The transmission device of claim 11, wherein the random access channel generation portion uses a user ID for random access in order to generate the random access channel.

13. The transmission device of claim 11, wherein the random access channel generation portion uses a user ID provided from a handover destination base station via a handover originating base station in order to generate the random access channel.

14. A reception device comprising:
a reception portion that receives a random access channel including a preamble portion and an L1/L2 control message portion from a mobile station; and
a detection process portion that detects the preamble portion and the L1/L2 control portion in the random access channel received by the reception portion based on a product of a number of codes and frequency bands,
wherein a frequency bandwidth for transmitting the random access channel is selected by the mobile station, and the random access channel is transmitted using a code selected from plural codes in which the preamble portion and the L1/L2 control message portion are transmitted continuously in time as one burst with no time delay between the preamble portion and the L1/L2 control message portion.

15. The reception device of claim 14, further comprising a control portion that controls a center frequency by which assignment for the random access is carried out, wherein the detection process portion detects the preamble portion and the L1/L2 control message portion in the random access channel in accordance with the center frequency.

16. The reception device of claim 15, wherein the control portion controls a hopping pattern by which assignment for random access is performed, and wherein the detection process portion detects the preamble portion and the L1/L2 control message portion in the random access channel in accordance with the hopping pattern.

17. A random access control method comprising:
a random access channel generation step wherein a random access channel including a preamble portion and an L1/L2 control message portion is generated;
a assignment step wherein one of a continuous frequency assignment and a discontinuous comb-shaped frequency assignment for each user in a frequency band assigned to a contention-based channel is performed; and
a transmission step wherein the random access channel is transmitted with variable multi-bandwidth in accordance with the assignment by transmitting the preamble portion and the L1/L2 control message portion continuously in time as one burst with no time delay between the preamble portion and the L1/L2 control message portion.

18. The random access control method of claim 17, further comprising a step wherein at least one of a channel estimation for demodulation of the L1/L2 control message portion, identification of a carrier frequency in a multi-bandwidth system, and a reception timing measurement for an uplink transmission timing control is performed based on the preamble portion.

19. The random access control method of claim 17, further comprising a step wherein information necessary for link establishment and reservation information necessary to transmit data through a subsequent shared data channel are stored in the L1/L2 control message portion.

20. The random access control method of claim 17, wherein the assignment step assigns any one of plural continuous divided assigned bands into which an assigned band is divided, when the continuous frequency assignment is performed.

21. The random access control method of claim 17, wherein the assignment step assigns any one of plural comb-shaped divided assigned bands into which an assigned band is divided, when the discontinuous comb-shaped frequency assignment is performed.

22. The random access control method of claim 17, further comprising a transmission power control step wherein a transmission power ratio between the preamble portion and the L1/L2 control message portion is controlled.

23. The random access control method of claim 17, further comprising a transmission control step wherein at least one of a transmission bandwidth and a spreading factor that spreads the random access channel is controlled in accordance with a reception state.

24. The random access control method of claim 17, further comprising a burst length control step wherein a burst length of the random access channel is changed in accordance with at least one of the spreading factor and the transmission bandwidth.

* * * * *